United States Patent [19]

Koike

[11] Patent Number: 4,723,291

[45] Date of Patent: Feb. 2, 1988

[54] VOICE GENERATING DEVICE

[75] Inventor: Eishi Koike, Sagamihara, Japan

[73] Assignee: Ozen Corporation, Tokyo, Japan

[21] Appl. No.: 643,015

[22] Filed: Aug. 22, 1984

[30] Foreign Application Priority Data

Aug. 22, 1983 [JP] Japan ............................ 58-152951

[51] Int. Cl.[4] ............................................. G10L 5/00
[52] U.S. Cl. ................................ 381/51; 340/825.51; 369/29
[58] Field of Search ................ 369/29; 340/825.51; 381/51–53

[56] References Cited

U.S. PATENT DOCUMENTS

| | | | |
|---|---|---|---|
| 3,395,394 | 7/1968 | Cottrell | 340/825.51 |
| 3,445,812 | 5/1969 | Clarke | 340/825.51 |
| 4,071,716 | 1/1978 | Schneider | 369/29 |
| 4,075,436 | 2/1978 | Bolick et al. | 362/29 |
| 4,513,284 | 4/1985 | Right | 340/825.51 |
| 4,571,586 | 2/1986 | Right | 340/825.51 |

Primary Examiner—Emanuel S. Kemeny
Attorney, Agent, or Firm—Arnold S. Weintraub

[57] ABSTRACT

A voice generating device has n input signal lines (wherein n denotes an integer of 2 or more), each of which receives an input signal, an n output signal lines, each of which generates an output signal corresponding to each of the input signals, and a preferential selection circuit which selects any one of said input signals according to a predetermined priority ranking commencing from the first to nth in order. The voice generating device successively scans each of the output signal lines one after another and generates a voice message corresponding to only the highest priority output signal.

3 Claims, 2 Drawing Figures

VOICE GENERATING DEVICE

BACKGROUND OF THE INVENTION

1. Field of the Invention

This invention relates to a voice generating device and particularly, to a voice generating device which can generatea plurality of pieces of message-like information and, more particularly, to a voice generating device including a preferential selection circuit which is able to select only one of such pieces of information according to a pre-determined priority when a plurality of messages are demanded concurrently or in a repeated manner.

2. Description of the Prior Art

In recent years, many kinds of machines or equipment, for instance, motor cars and other vehicles, machinery, equipment and building accessories, have increasingly been equipped with sound generating devices which notify the driver or operator handling these machines of their condition and of items which need to be checked and possibly taken care of by means of a voice messages, occassionally with accompanying sounds.

Some of these sound generating devices carry a separate voice synthesizing device, but most of them, rather, adopt voice generating devices utilizing a record disc or the like, due to the lower cost and more acceptable voice quality obtainable by the latter type of device.

Generally, it is required for these types of vehicles, machinery or equipment, to generate several kinds of messages corresponding to the possible situations or conditions expected to be encountered in the operation of the aforesaid vehicles or the like. Occassionally, two or more voice messages are required to be generated, either concurrently or in a repeated manner. In these circumstances, voice messages to be given to the driver or operator are selected either by following the order of a message which should have been issued earlier or selecting any one of them when a plurality of messages are required almost simultaneously. In such cases, a voice message corresponding to that selected earlier is uttered. Subsequently, the remaining message or messages are generated only after some remedial action has been carried out in response to the previous voice message.

With such a message generating system, it is feared that when a plurality of voice messages are required simultaneously or in an overlapping manner, the most important voice message might be passed over, thus preventing suitable and prompt remedial action from being taken, depending upon the construction or condition of the vehicle or the apparatus to which the message generating system is attached. This could result in serious trouble or damage to the vehicle or equipment.

The present invention has been conceived in view of the existing problems in the prior art devices.

Accordingly, an object of this invention is to solve such above-mentioned problems. Another object of this invention is to provide a voice generating device which can selectively utter a voice message of highest priority or importance at that moment, even if a plurality of messages are demanded concurrently or in an overlapping manner.

SUMMARY OF THE INVENTION

The distinguishable feature of the voice generating device of the present invention resides in the fact that the device comprises n input signal wires (where n denotes an integer number of two or more), output signal wires of the same number as the input signal wires and a preferential selection circuit which can select out of a plurality of input signals received on the input signal lines, one of the input signals in accordance with a predetermined priority scheme commencing from one to the number n, and successively scan each of the output signal lines and generate a voice signal corresponding to the output signal.

By virtue of this construction, the device of the present invention can generate a critical voice message early on, depending upon the rank of importance of the voice messages, even if it receives a plurality of signals demanding that several voice messages be generated almost simultaneously.

The device of the present invention comprises: a plurality of input signal lines from 1 to n; a plurality output signal lines from 1 to n; and a preferential selection circuit which can select and generate only a single output signal out of the n number of output signals in accordance with a predetermined priority ranking starting from the 1st to the nth, wherein the selection circuit successively scans the output signal lines until it can select the voice signal corresponding to the given output signal. Accordingly, the device of the present invention can utter a voice message of more importance and higher priority first, without passing over the higher priority voice message because it has received a plurality of almost simultaneous demand signals.

DETAILED DESCRIPTION OF THE PREFERRED EMBODIMENTS

Figure 1:
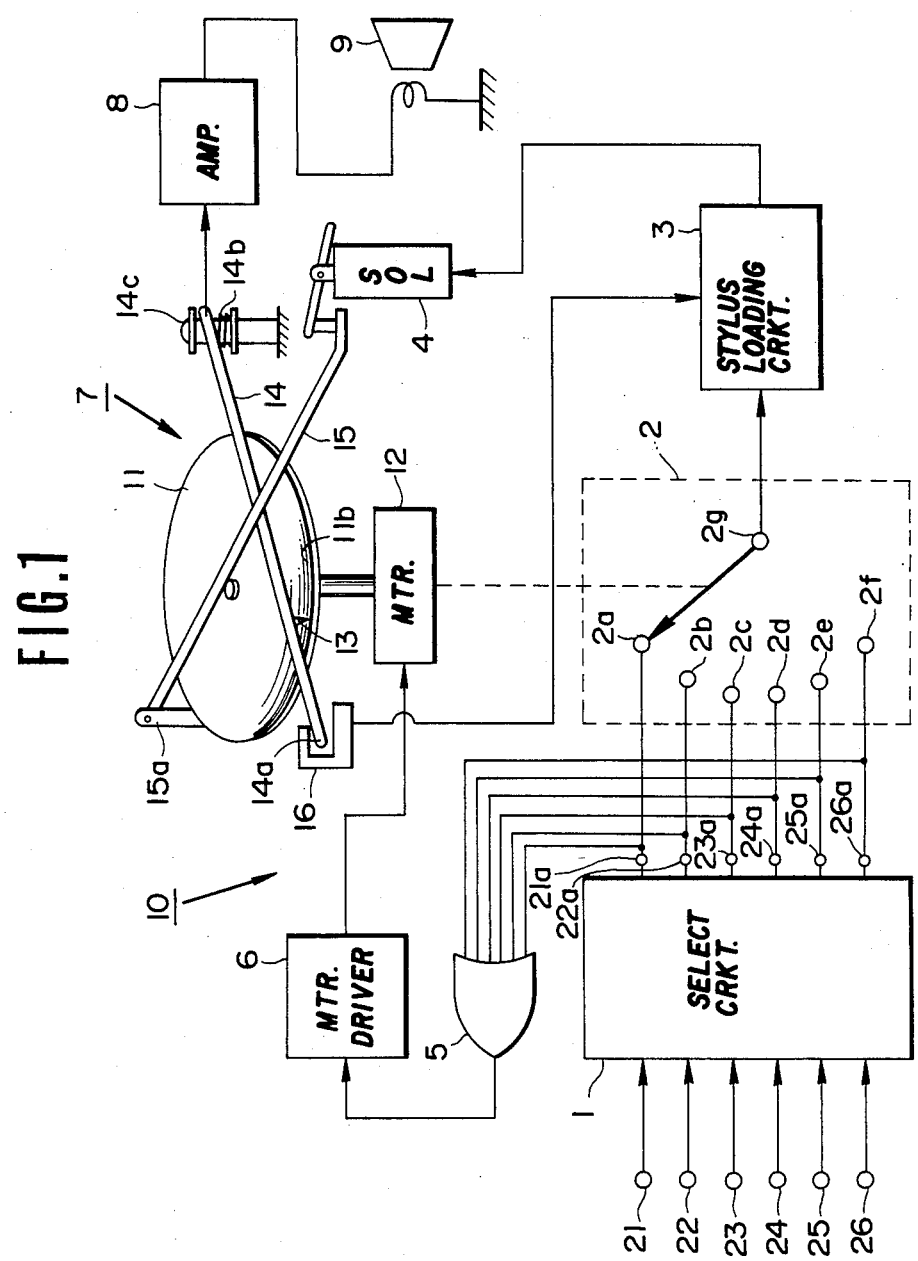
FIG. 1 is a schematic drawing showing the major components of a voice generating device of the present invention.

In FIG. 1 of the drawing, reference numeral 10 denotes a voice generating device comprising: a preferential selection circuit 1, a rotary switch 2, a stylus loading circuit 3, a stylus load solenoid 4, a motor starting ciruit 5, a motor driving circuit 6, a voice generating device 7, an amplification circuit 8 and a speaker 9.

The voice generating device 7 includes a record disc 11 carrying a plurality of record grooves 11b in which a plurality of voice messages are recorded, a motor 12 which rotates the record disc 11 at a pre-determined speed of rotation, a tone arm 14 carrying a reproducing stylus 13 at its forward free tip end, a loading arm 15 which loads the reproduciing stylus 13 on the record disc through the tone arm 14 and a detector 16 which detects the arrival of the tone arm 14 at an end point of voice reproduction.

Selection of the desired message is performed by an output signal generated in any one of output terminals 21a, 22a, 23a, 24a, 25a and 26a in the preferential selection circuit 1 in reply to an input signal received on any one of corresponding input terminals 21, 22, 23, 24, 25 and 26.

The output terminals 21a, 22a, 23a, 24a, 25a and 26a are connected to contact terminals 2a, 2b, 2c, 2d, 2e and 2f, respectively, of the rotary switch 2 and to the motor starting circuit 5 composed of an OR gate.

When an output signal is generated at any one of these output terminals, for example, at the output terminal 22a, the output signal is imparted to the contact terminal 2a connected thereto and also to the motor starting circuit 5. The motor starting circuit 5 actuates the motor driving circuit 6, resulting in rotation of the motor 12 of the voice generating mechanism 7.

When the motor 12 rotates, the record disc 11 will rotate at a pre-determined speed, causing a switch connected to the rotary contact 2g of the rotary switch 2 and synchronised with the rotation of the record disc 11, to scan each of the contacts 2a, 2b, 2c, 2d, 2e and 2f, one after another. It is to be noted that the time interval between each successive electrical connection of the rotary contact 2g with a contact 2a, 2b, 2c, 2d, 2e and 2f if set so that the starting points of each the respective record grooves 11b having the voice messages recorded thereon will successively be located at a point where sound reproduction may be initiated as the record 11 rotates.

At the moment when the rotary contact 2g is connected to one of the contacts carrying an output signal, contact 2b in the example, the output signal is supplied to the stylus loading circuit 3, which generates an actuating signal to actuate the stylus load solenoid 4.

When the stylus load solenoid 4 has been actuated, loading arm 15 is swung slightly downward about a fluculum 15a and pushes the tone arm 14 downward.

Then the reproducing stylus 13 disposed on the tone arm 14 will fall into a record groove 11b on the record disc 11 which corresponds to the contact 2b of the rotary switch 2.

As the result, the reproducing stylus 13 traces the record groove and reproduces the required voice message corresponding to the contact 2b, which is amplified by the amplifier 8 and then transmitted through the speaker 9. As the motor 12 rotates, the tone arm 14 continues its swing motion about a pole 14c toward the center of the record disc 11 until the stylus 13 arrives at the end point of the sound groove 11b. At this moment, the extended tip end 41a of the tone arm 14 is detected by a detector 16 equipped with a photo interrupter. The detected signal is given to the stylus loading circuit 3, which generates a signal deactuating the stylus load solenoid 4. Thus the load solenoid is placed out of action such that the load applied by the loading arm acting to push down the tone arm 14 is released to actuate a return spring 14, thus resulting in a lifting up of the tone arm 14 to the initial position in the direction opposite to that of sound reproduction movement accross the record disc 11.

At this stage, it is possible to select the desired recorded groove in response to the extent of the swing motion of the rotary switch 2 activated by an output signal generated in the preferential selection circuit 1. Another voice message can be reproduced in a similar matter in response to any one of the output signals in the preferential selection circuit 1. If the same output signal is given to the contact 2b again or is given continuously, the same voice message is repeatedly generated.

The direction of swing motion of the rotary switch 2 follows the priority of the output signals from higher toward lower order, that is, the order starting from the contact terminals 2a, next 2b, 2c, 2d, 2e and upto 2f and then returning again to the contact 2a. The priority order of the contract terminals is set to agree with the order in importance of the voice messages.

In the embodiment described above, a plurality of voice messages are previously recorded in the grooves 11b of the record disc 11 according to the established priority of their importance and these messages are successively allotted to each of the contact terminals 2a, 2b, 2c, 2d, 2e and 2f, respectively, of the rotary switch 2.

Thus, the voice messages to be generated are successively scanned according to the established priority of their importance, namely, from the most important down to the message of least importance. This may be effective accomplished when voice generating device 10 can scan with a high scanning speed; however, when the scanning speed is low, the rotary switch 2 can swing in reverse direction as an alternative way of scanning, from the contact of lower priority to the higher ones.

If a number of input terminals 21, 22, 23, 24, 25 and 26 receive output demanding voice signals concurrently or in a repeated manner, then the preferential selection circuit 1 selects the one input terminal of highest priority among those of the input terminals 21, 22, 23, 24, 25 and 26 receiving input signals and generates an output signal in the corresponding output terminal 21a, 22a, 23a, 24a, 25a and 26a.

In this embodiment of the present invention, priority from the first to the sixth is allotted to the input terminals in the order from terminals 21, 22, 23, 24, 25 and 26 which correspond to contact terminals 2a to 2f, respectively, of the rotary switch 2.

As an example, assume that the input terminals 22 and 24 simultaneously or in a closely overlapped manner receive two voice demanding signals. Since, in this case, the input terminal 22 has priority over the input terminal 24, an output signal is generated only at the output terminal 22a resulting, as described above, in reproduction of the voice message corresponding to the input terminal 22.

Figure 2:
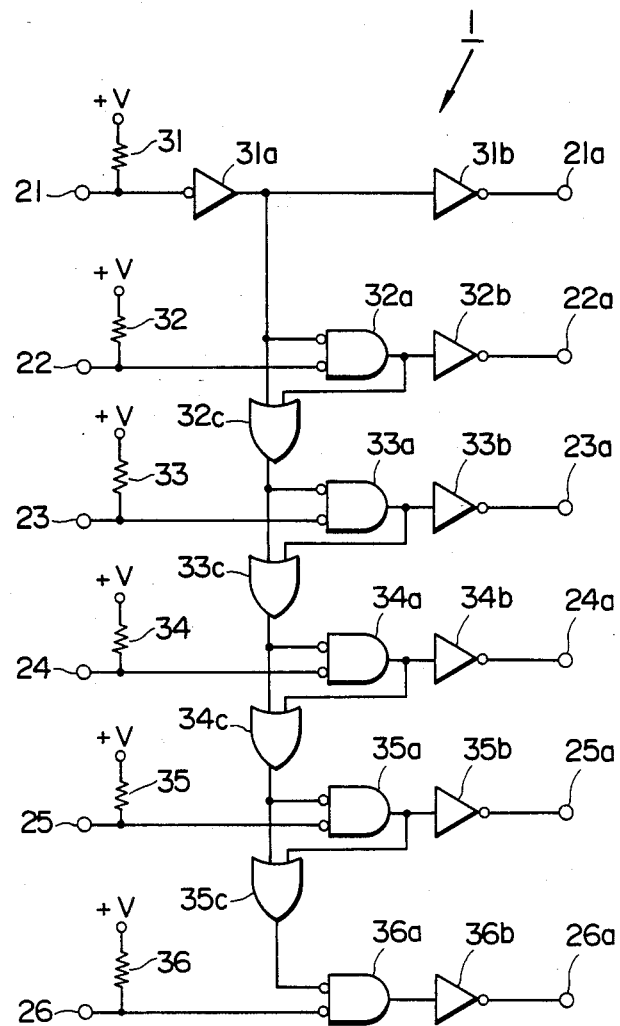
FIG. 2 is a substantial block diagram of the preferential selection circuit of the voice generating device shown in FIG. 1.

An example of the preferential selection circuit N is shown in FIG. 2.

As shown in FIG. 2, preferential selection is accomplished by a logic circuit composed of identical combinations of logical elements which enable the circuit to be of small size and of low cost. This type of selection circuit is advantageous particularly when many different voice messages are demanded: no complicated electric circuit is required.

The input terminal 21 is connected to both a pull-up resistor 31 and an inverter 31a is normally held at a High level (hereafter merely referred to "H"). The output of the inverter 31a is connected to the output terminal 21a via a driver 31b (inverted output type), which arrangement is the same in the other connections. As a consequence, when the input terminal 21 receives an input signal of Low level (hereafter merely referred to "L") as a voice demanding signal, an "L" level signal is generated at the output terminal 21a. In this example, both the input signal and the output signal are effectively at "L" as a negative true logic.

The next input terminal 22 is normally made "H" by a pull-up resistor 32 and is connected to one of the input terminals of a NOR gate 32a. The output of the NOR gate 32a is connected to the output terminal 22a via a driver 32b. The other input terminal of the NOR gate 32a is connected to the output of the inverter 31a. As the result, when the input terminal 21 receives a voice demanding signal of "L" level, one input of the NOR gate 32a is driven "H". Accordingly, even if the input terminal 22 receives a voice demanding signal of "L" level, the output of the NOR gate 32a is maintained "L", so that the output terminal 22a is also kept "H", thereby preventing an output signal from being generated at output terminal 22a. This means that the input signal of "L" to the input terminal 22 does not produce any output signal. In other words, an input signal of "L" to the input terminal 21 blocks any output signal from being generated at any output terminal 22a, 23a, 24a, 25a and 26a.

On the other hand, when the input terminal 21 is in "H", the inverter 31a becomes "L". Since one output of the NOR gate 32a is "L", the moment when the input terminal 22 becomes "L" (when a voice demanding signal is supplied) the output of the NOR gate 32a becomes "H" which is inverted through the driver 32b, and causes an output signal of "L" level to be generated at the output terminal 22a.

The input terminal 23 is also normally made "H" by means of a pull-up resistor 33 and is connected to one input terminal of a NOR gate 33a, the output of which is connected to the output terminal 23a through a driver 33b. The other input terminal of the NOR gate 33a receives both the output of the inverter 31a and the NOR gate 32a through an OR gate 32c.

As a consequence, when a signal of "L" level is applied to either one of the input terminals 21 or 22, the inverter 31a or the NOR gate 32a will be driven "H", so that one of the input terminals of the NOR gate 33a will also be driven "H". Accordingly, even if the input terminal 23 receives a signal of "L", the output of the NOR gate 33a is held "L" and the output terminal 23a is maintained "H", and, thus, does not generate an output signal.

If both the input terminals 21 and 22 are in "H" level, the inverter 31a and the NOR gate 32a will be driven "L", and since both inputs of the NOR gate 33a is "L", the output of the NOR gate 33a will become "H" and can be inverted through a driver 33b, to drive the output terminal 23a to a level "L".

The input terminal 24 is normally held "H", in a similar manner, by a pull-up resistor 34 and is connected to one input terminal of a NOR gate 34a, while the output of the NOR gate 34 is supplied through a driver 34b to the output terminal 24a.

The other input terminal of the NOR gate 34a receives the outputs of the OR gate 32c and NOR gate 33a through an OR gate 33c. Consequently, in a manner similar to that described above, if a voice demanding signal of "L" level is given to either one of the input terminals 21, 22 or 23, an output signal corresponding to the input terminal 24 is blocked and the corresponding output terminal 24a is maintained "H".

On the other hand, if all the input terminals 21, 22 and 23 are at a level "H", there would be generated an output signal of "L" level at the output terminal 24a at the instant when the input terminal 24 receives a signal of "L" level.

The input terminal 25 is normally held "H" by a pull-up resistor 35 and is connected to one input terminal of a NOR gate 35a, an output of which is supplied through a driver 35b to the output terminal 25a. The other input terminal of the NOR gate 35a receives the outputs of the OR gate 33c and the NOR gate 34a through an OR circuit 34c. The function of the input terminal 25 is identical to that of the input terminal 24.

The input terminal 26 is normally rendered "H" by a pull-up resistor 36 and is connected to one input terminal of a NOR gate 36a, the output of which is supplied through a driver 36b to the output terminal 26a. The other input terminal of the NOR gate 36a receives outputs from the OR gates 34c and the NOR gate 35a through an OR gate 35c. The function of the input terminal 26 is also identical to that of the input terminal 24 described before.

As noted above, when the voice generating device 10 of this invention receives a plurality of voice generating demands as input signals simultaneously or in an overlapping manner, the voice generating device 10 can block the demand signal of a lower priority input at that instant and preferentially select only one input signal of a higher priority for generating a selected output signal.

It is to be noted, however, when the device 10 has already generated a voice signal corresponding to a voice demanding signal of lower priority which was received immediately before receiving an input signal of higher priority, transfer of the output signal to that of the higher priority can be made only after the lower priority voice message reproduction has been completed. Since in many cases, however, the swingable rotational scanning speed of the rotary switch 2 of the present invention is comparatively low due to synchronization with the rotational speed of the record disc 11, the time lag which may be encountered between several input signals demanding different kinds of voice messages can be disregarded, and the voice signal of higher priority can be selected and reproduced with the least practicable delay.

In the embodiment described above, the NOR gate and the drive comprise a gate circuit, and the OR gate acts to send a trigger signal to a gate circuit of the next stage (corresponding to the input signal of succeeding lower priority). Alternatively, this trigger signal can be used by inverting or negating an output signal so that the trigger signal in the present embodiment can be obtained as an output of the inverter 31 or each of the NOR gates of each input stage.

Although the inverter 31 generates its output signal by inverting the input signal, such a signal may also be obtained by inverting the output signal of the driver 31b.

The inverer 31 and the driver 31b of this embodiment merely constitute a signal circuit for transmitting the input signal of the first or highest priority to the output side.

Although the above-explanation has been made by referring to the preferential selection circuit 1 shown in FIG. 2, since such a preferential selection circuit 1 can be reduced into practice by many other logical circuits it should not be construed to be restricted to the embodiment illustrated in FIG. 2. It should be understood that the logical circuit of FIG. 2 can be formed by using and combining a plurality of the same logical elements into a single integrated circuit. In addition, since integrated circuits are made by integrating a plurality of quite similar logical elements, the present invention can include a preferential selection circuit 1 capable of handling a greater number of signals, each demanding a different voice message.

Although the preferential selection circuit 1 of the present invention has been described as comprising a plurality of input terminals at various priority stages (levels), it can directly receive output signals from other circuits. It has only to have signal lines, each line receiving signals demanding generation of a different voice message.

Though the embodiment is explained with reference to a device which receives six different voice demanding signals and generating the same number of voice messages, it goes without saying that the inventive concept herein can be applied to a device capable of receiving signals of any number n. The larger the number, the more useful it will be.

The embodiment has been explained for a voice generating means using a record disc. However, other means such as "voice synthesizing devices" can also be used.

A part of the device in the embodiment described above consisting of rotary switch 2, stylus loading circuit 3, stylus load solenoid 4, motor starting circuit 5, motor actuating circuit 6, voice generating means 7, amplifying circuit 8, speaker unit 9 and so forth is an example of a voice generating circuit which selects and generates a voice message corresponding to any one of the output signals according to the present invention.

What is claimed is:

1. A voice generating device comprising:

n input signal lines wherein n denotes an integer of 2 or more), each of which receives a separate input signal each of said input signal lines being sequentially assigned a priority in the order of from a first to an n-th priority;

a preferential selection circuit connected to said input signal lines and having output terminals respectively corresponding to said input signals lines, said preferential selection circuit being adapted to pass to a corresponding output terminal one input signal received at an input signal line whose priority is higher than that of other input signal when a plurality of input signals are received;

voice generating means including a recorded disc having n different messages recorded thereon at positions respectively corresponding to said output terminals of said preferential selection circuit, said voice generating means reproducing the one of said n different messages corresponding to the output terminal at which the passed input signal appears;

rotary switch means for sequentially scanning the output terminals of said preferential selection circuit to detect the output terminal at which the passed input signal appears; and driving means responsive to the passed input signal appearing at the corresponding output terminal of said preferential selection circuit for driving said voice generating means and said rotary switch means in a timed relationship with each other so that a message recorded at the position of said recorded disc corresponding to the output terminal scanned and detected by said rotary switch means is reproduced.

2. The voice generating device as claimed in claim 1, wherein n denotes an integer of 3 or more, and the preferential selection circuit comprises a signal circuit which receives a first input signal and generates a first output signal corresponding to the first input signal, gate circuits n-1 in number including at least second and third gate circuits each of which receives second to nth input signals and generates output signals from a second to nth, respectively, wherein a gate signal for the second gate circuit is a signal corresponding to the first input signal, a gate signal for the third gate circuit is a logic sum of an inverted signal of an output signal of the second gate signal and the signal formed by inverting either the first input signal or the first output signal.

3. The voice generating device as claimed in claim 1 wherein n denotes an integer of 4 or more, and a gate signal for the ith gate signal is a logic sum of an inverted signal of the output signal of a (i-1)th gate circuit (where i is an integer from 4 to n) and an inverted signal of the output signal of the (i-2)th gate circuit, and wherein the preferential selected signal is formed by sequentially selecting i from 4 to n.

* * * * *